Dec. 4, 1951 G. HITE ET AL 2,577,522
ELECTRICAL PULSE GENERATING CIRCUIT
Filed Nov. 16, 1945
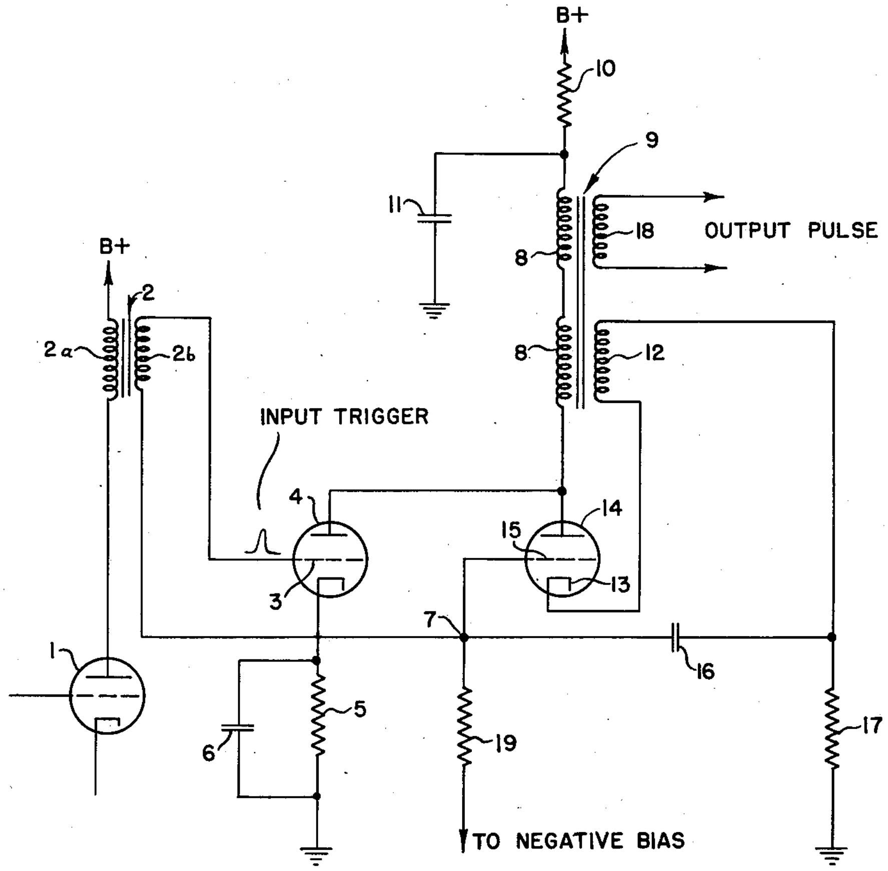
INVENTORS
GEORGE HITE
GLENN E. WHITHAM
BY William D. Hall
ATTORNEY Patented Dec. 4, 1951 2,577,522

UNITED STATES PATENT OFFICE 2,577,522

ELECTRICAL PULSE GENERATING CIRCUIT

George Hite, Dorchester, and Glenn E. Whitham, Wollaston, Mass., assignors, by mesne assignments, to the United States of America as repsented by the Secretary of War Application November 16, 1945, Serial No. 629,158

4 Claims. (Cl. 250—27)

This invention relates in general to electrical generators and more particularly to an electrical circuit which will generate a strong pulse of short duration upon being triggered by a relatively weak pulse.

In radio detecting and ranging apparatus and in television, the production of short, accurately timed pulses is of great importance. In almost all instances, it is essential that the pulses have a very rapid rise and that the spacing between pulses be very accurately timed. In many instances, it is also important that the tail end of the pulse be very steep.

One means for obtaining pulses of this shape is the blocking oscillator. The blocking oscillator, by itself, will usually not produce pulses which are very accurately spaced, in many cases depending merely on the rate of discharge of a capacitor for timing. The blocking oscillator in this invention, however, is triggered by small relatively weak pulses which are very accurately spaced but which do not have to have a special shape. The production of such trigger pulses is relatively simple and may be accomplished by any one of several well known means. It is desirable, but not necessary, for these pulses to have a very steep front.

An object of this invention therefore is to devise a blocking oscillator circuit which can be triggered by a relatively weak pulse.

Another object of the invention is to devise a simple blocking oscillator circuit, using standard tubes, which will produce a well shaped pulse of relatively large amplitude.

A still further object is to provide a blocking oscillator with an input amplifier to permit the use of weak trigger pulses.

Other objects and advantages will become readily apparent from the hereinafter described specification.

The invention in general contemplates the use of two vacuum tubes using a primary winding of a blocking oscillator transformer as a common plate impedance and with the cathode of one of the tubes receiving a pulse from a secondary winding on the same transformer. One of the tubes has its grid connected to the secondary of a pulse transformer so that it can be triggered by a pulse applied to the primary of the pulse transformer. The anode of this tube, as well as the anode of the second tube, is connected to a source of positive potential through a primary winding of the blocking oscillator transformer. A secondary winding of this transformer is connected between the cathode and ground in such a way that when the oscillator is triggered the cathode will be driven negative thereby making the grid positive with respect to the cathode and causing grid current to flow, charging a capacitor connected between grid and ground. This initiates the blocking oscillator action which continues until saturation of the tube or the transformer or of both takes place, at which time the pulse is rapidly terminated.

The invention will be best understood by referring to the single figure of the drawing which shows an embodiment of the invention.

The figure shows a tube 1 as the source of the pulse. The anode of the tube is connected to a source of positive potential through the primary winding 2*a* of a transformer 2. With the proper signal from an external source (not shown) applied to the grid of the tube, a short pulse of current will flow in the primary winding and induce a short pulse of voltage in the secondary winding 2*b*. This short pulse of voltage in the secondary will be applied to the grid 3 of tube 4. The bias on tube 4 is normally very negative, due to the self bias obtained from cathode resistor 5 and the steady negative bias on the grid from the bias source (indicated). The potential on the cathode of tube 4 will remain fairly constant even during the pulse, due to the action of capacitor 6.

The polarity of the secondary winding 2*b* is arranged so as to make the pulse applied to the grid 3 positive. Tube 4 will accordingly start to draw more anode current through the primary winding 8 of the transformer 9. The resistor 10 and capacitor 11 make up a filter to isolate the source of positive potential from the transformer winding 8. The change in primary current will induce a voltage in the secondary winding 12. The winding 12 is connected between ground and the cathode 13 of tube 14 in such a way that the potential of the cathode will be driven negative with respect to ground. The potential on the grid 15 does not change immediately, since it is connected to ground through capacitor 16 and the low resistance 17. The tube 14 begins to conduct more heavily since the bias is less negative. This starts the regenerative action typical of the blocking oscillator. The cathode is driven sufficiently far negative so that the grid becomes positive with respect to the cathode and grid current flows, even though the grid itself is below ground potential, and the flow of grid current places a charge on capacitor 16 which makes the potential at point 7 even more negative and cuts off tube 4. This prevents tube 4 from interfering with the action of the blocking oscillator. As soon as the rate of increase of anode current in tube 14 decreases due to saturation of the space charge in the tube, the voltage induced in winding 12 decreases, making the cathode less negative. This immediately initiates the degenerative action, typical of the blocking oscillator rapidly terminating the pulse. The pulse output is taken from the output winding 18 of the transformer and the polarity will depend on the connections made to the winding. The resistor 17 may, if desired, be used as a low impedance source for a low voltage pulse of substantially the same shape as the main pulse. The blocking oscillator is ready for another trigger pulse as soon as the charge accumulated on capacitor 16 leaks off through the resistor 19.

The following typical values are given for the resistances and capacitances, using an anode supply of 250 volts and the twin triodes of a type 6SN7 for tubes 4 and 14:

| | | |
|---|---|---|
| Resistor 5 | ohms | 4,700 |
| Resistor 10 | do | 10,000 |
| Resistor 17 | do | 10 |
| Resistor 19 | do | 10,000 |
| Capacitor 6 | mf | 0.01 |
| Capacitor 11 | mf | 0.1 |
| Capacitor 16 | mf | 0.02 |

With the foregoing values, the negative bias to which resistor 19 is connected should be 18 volts. These values are purely exemplary and are not intended to limit the invention to the use thereof only.

It has been found that, using the foregoing values with well designed transformers, a well formed pulse of large amplitude is obtained from the output winding 18 of the transformer 9.

The design of the blocking oscillator transformer 9 is very important. If the transformer is poorly designed the shape of the pulse will tend to be poor no matter how well designed the rest of the circuit is.

The duration of the pulse depends primarily on the tube used, the anode potential and the blocking oscillator transformer. The regenerative action usually continues until the tube begins to reach its saturation point and the rate of change of anode current decreases. The saturation point is, of course, determined by the tube used and the anode potential. The length of time required to reach the saturation point will, in addition, depend to a large extent on the transformer used.

The shape of the trigger pulse is not particularly important since all that is required is a slight increase in positive potential on the grid of tube 4 to initiate the regenerative action. Once tube 4 starts to conduct more heavily, the signal on the grid 3 will have no effect on the blocking oscillator action or the shape of the output pulse. The purpose of tube 4 is to serve as an amplifier for the relatively weak trigger pulse. Tube 4 serves merely to initiate the blocking oscillator action and could be omitted if a trigger pulse of sufficiently large amplitude were used.

The tube used need not be a type 6SN7. A type 7F8 tube could be used or two separate tubes such as the type 6J5. The tubes used could also be pentodes but, in general, the additional complication introduced by the use of a pentode is not warranted.

Of course modifications may be made to fit specific problems and these modifications will readily suggest themselves to one skilled in the art and therefore there is no reason for limiting the invention to the use of the particular tubes recited.

It will be apparent that there may be deviations from the invention, as described, which still fall fairly within the spirit and scope of the invention.

Accordingly we claim all such deviations which fall fairly within the spirit and scope of the invention as identified in the hereinafter appended claims.

What is claimed is:

1. A blocking oscillator comprising first and second vacuum tubes each having an anode, a cathode, and at least one grid, a transformer having at least two windings, a first winding of said transformer electrically connecting the anodes of said vacuum tubes to a source of positive potential, a second winding of said transformer coupling the cathode of said second tube to a point of reference potential in such a way that an increase in anode current will lower the potential on the cathode of said second tube with respect to said point of reference potential, a source of negative potential, resistive means electrically connecting the control grids of said tubes to said source of negative potential, capacitive means electrically coupling said grids to said point of reference potential, means coupled to the grid of said first tube and including a second transformer for applying a positive pulse to the grid of said first tube, and biasing means connected between the cathode of said first tube and said point of reference potential, for maintaining said first tube in a normally non-conductive state.

2. A blocking oscillator comprising a transformer, a first vacuum tube having an anode, a cathode, and at least one grid, one winding of said transformer electrically connecting the anode of said first tube to a source of positive potential, a source of negative potential, means electrically connecting the control grid of said first tube to said source of negative potential, a second vacuum tube having an anode, a cathode, and at least one grid, means connecting the anode of said second tube to the anode of said first tube, a second winding of said transformer coupling the cathode of said second tube to a point of reference potential, means electrically connecting the grid of said second tube to the grid of said first tube, a capacitor electrically coupling said grids to said point of reference potential, and means connecting the cathode of said first tube to said point of reference potential, for maintaining said first tube in a normally non-conductive state..

3. In combination, a pulse amplifier comprising a first triode vacuum tube whose grid is receptive of triggering voltage pulses, a transformer, the primary winding of said transformer connecting the anode of said first tube to a source of positive potential, and a blocking oscillator including a second triode vacuum tube whose anode is connected to the anode of said first tube, the secondary winding of said transformer connecting the cathode of said second tube to a point of reference potential so that the potential on said cathode is dependent on the rate of change of current in said primary winding.

4. The combination of claim 3, further including capacitive means connected between said secondary winding and said first tube for rendering said first tube inoperative upon the triggering of said block oscillator.

GEORGE HITE.
GLENN E. WHITHAM.

REFERENCES CITED

The following references are of record in the file of this patent:

UNITED STATES PATENTS

| Number | Name | Date |
|---|---|---|
| 2,212,202 | Faudell et al. | Aug. 20, 1940 |
| 2,254,087 | Percival | Aug. 26, 1941 |
| 2,411,573 | Holst et al. | Nov. 26, 1946 |